BEST AVAILABLE COPY
Electric Railway-Signal Apparatus.
No. 6,318. Reissued March 2, 1875.
246-220
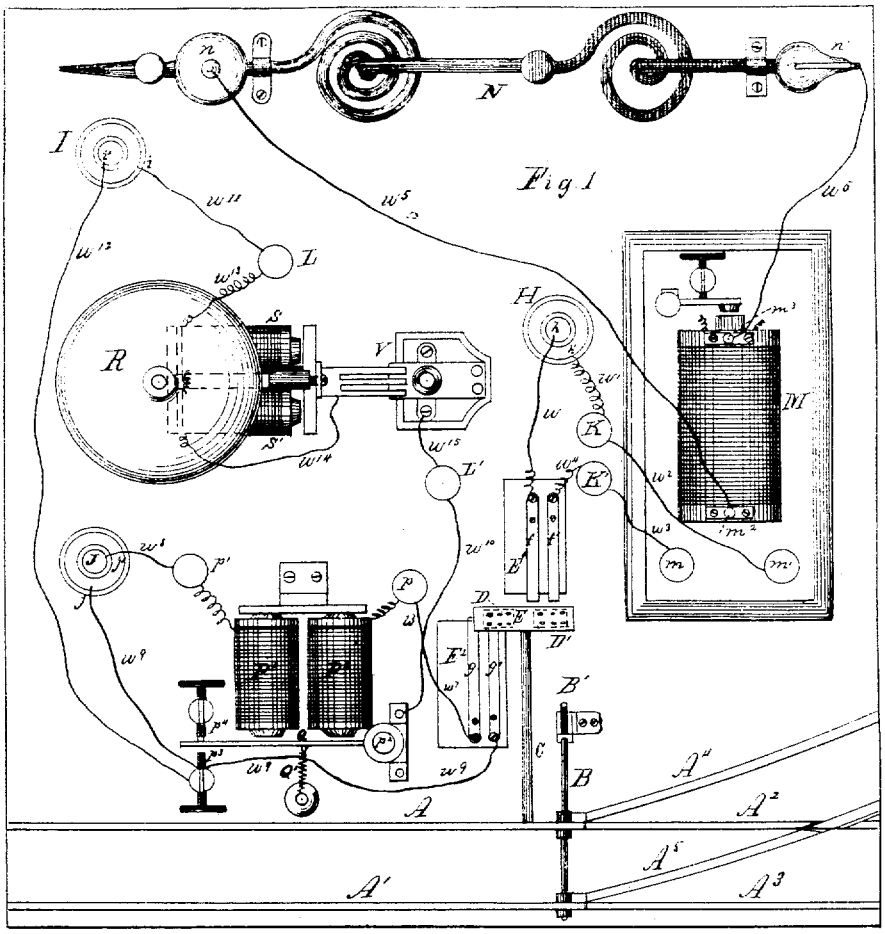
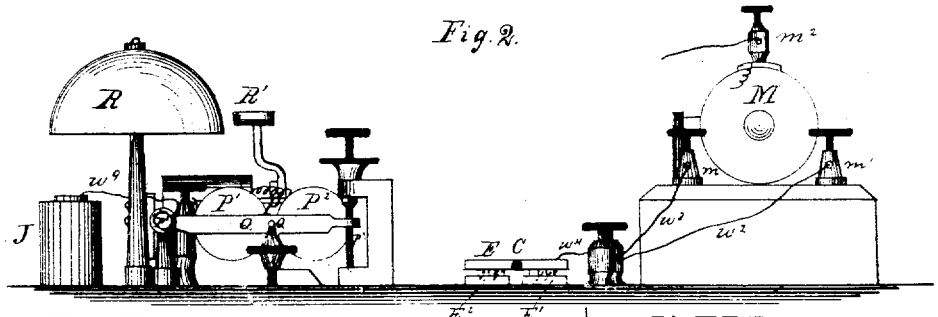
WITNESSES=
Philip W. Hale,
R. H. Whittemore
INVENTOR.
H. W. Spang,
per Richards & Hale,
Attorneys.
THE GRAPHIC CO. PHOTO-LITH. 39 & 41 PARK PLACE, N.Y.

UNITED STATES PATENT OFFICE.

HENRY W. SPANG, OF READING, PENNSYLVANIA.

IMPROVEMENT IN ELECTRIC RAILWAY-SIGNAL APPARATUS.

Specification forming part of Letters Patent No. 141,395, dated July 29, 1873; reissue No. 6,318, dated March 2, 1875; application filed November 12, 1873.

*To all whom it may concern:*

Be it known that I, HENRY W. SPANG, of Reading, in the county of Berks and State of Pennsylvania, have invented a new and Improved Electric Railway-Signal Apparatus, of which the following is a specification:

This invention relates to the combination of a Geissler or vacuum coil, bulb, or tube, illuminated by a current of electricity, with one or more track or railway-switch circuit-closers, for controlling said current of electricity for general railway-signal or communicating purposes, the said circuit closer or breaker or devices, one or more, being operated or controlled by means usual and suitable for operating railway-signals; and, also, to the combination of the foregoing with a non-illuminated or audible or other signal apparatus.

In the accompanying drawing, Figure 1 represents a plan view of my invention as applied to a railway-switch. Fig. 2 is a side view, taken from the direction of the track, showing a side elevation of an audible signal, in this case an electric bell, and an end elevation of an induction-coil which is used for illuminating a Geissler tube, R being the bell, and M the induction-coil.

A $A^1$ are switch or movable rails, to which is connected the switch-rod B of the switch-lever B′. $A^2$ $A^3$ are the stationary main-line rails, and $A^4$ $A^5$ the stationary rails, of a siding or branch track. C is a metallic rod connected to the rail A or to the switch-rod B. It carries a cross-piece, E, of wood or other insulating material, upon which are fastened the metallic conducting-plates D D′. *f f′* and *g g′* are two pairs of metallic conductors, on opposite sides of the cross-piece E, and fastened respectively to blocks $E^1$ $E^2$ of insulating material. The insulated metallic plate D′ and conductors *f f′* form an electric circuit-closer, and the insulated metallic plate D and the conductors *g g′* an electric circuit-breaker, in case the movable rails A $A^1$ are misplaced or set in line with the rails $A^4$ $A^5$. H, I, and J are galvanic batteries, *h h′*, *i i′*, and *j j′* their respective poles. K K′ and L L′ are connecting screws or posts. M is an induction-coil, and *m* $m^1$ are its connecting-screws of primary wire, and $m^2$ $m^3$ its connecting-screws of secondary wire. N is a Geissler tube, of any suitable form or description. P is a relay-magnet, with the adjusting-screw $p^3$ with a platina point, and adjusting-screw $p^4$ with an insulated point, placed in any desired position. $P^1$ $P^2$ are its electro-magnets, whose wires are connected to the binding-screws $p^1$ *p*. $p^2$ is a connecting-point of the armature-lever Q. To said lever is attached the adjusting-spring Q′. R is an electro-magnetic alarm-bell, and V an automatic circuit closer and breaker. The magnets S S′ are connected to the binding-screw L by the wire $w^{13}$, and to the automatic circuit closer and breaker V by the wire $w^{14}$. The circuit closer and breaker V is connected to the binding-screw L′ by the wire $w^{15}$. Wire *w* connects the metallic conductor *f* with the pole *h* of the battery H; wire $w^1$ the pole *h′* with the binding-screw K; wire $w^2$ the screw K with the connecting-screw $m^1$ of the induction-coil M; wire $w^3$ the screw *m* of the induction-coil with connecting-screw K′; wire $w^4$ the screw K′ with the metallic conductor *f′*; wire $w^5$ the screw $m^2$ of the induction-coil with the connecting-point *n* of the Geissler tube N; wire $w^6$ the screw $m^3$ of induction-coil with connecting-point *n′* of the Geissler tube; wire $w^7$ the metallic conductor *g* with the connecting-screw *p*; wire $w^8$ the screw $p^1$ with the pole *j′* of the battery J; wire $w^9$ the pole *j* of battery J with the metallic conductor *g′*; wire $w^{10}$ the screw $L^1$ with the connecting-point $p^2$ of the armature-lever Q; wire $w^{11}$ the screw L with the pole *i* of battery I; and wire $w^{12}$ the pole *i′* of battery I with the adjusting-screw $p^3$ having a platina point.

When the switch is in its proper position the conducting-plate D′ is not in contact with the conductors *f f′*, and the electric current of the battery H is broken, but when the switch is misplaced the plate D′ is brought in contact with the conductors *f f′*, and the current of the battery H closed, which current, flowing over the primary wire of the induction-coil M, induces a more intense current in the secondary wire, which, flowing through the Geissler tube N, illuminates it; or, if the wires $w^{13}$ $w^{15}$ of the electro-magnetic alarm-bell R were connected to the connecting-screws K K′, the electric current from the battery H would cause the bell to be sounded.

BEST AVAILABLE COPY

When the switch is in proper position the conducting-plate D is in contact with the conductors $g$ $g'$, and the electric current of battery J is closed, the current passing over the electro-magnets $P^1$ $P^2$ of the relay-magnet P, attracting the armature-lever Q from the adjusting-screw $p^3$, and thus opening the circuit of battery I.

When the switch is misplaced the conducting-plate D is moved off the conductors $g$ $g'$ and the circuit of battery J is broken, the spring Q′, drawing the armature-lever Q against the adjusting-screw $p^3$, closes the circuit of the battery I and causes the electro-magnetic alarm-bell to be sounded; or, if the wires $w^2$ $w^3$ of the induction-coil M were connected to the connecting-screws L L′, the circuit of the battery I, flowing over the primary wire of the induction-coil, would induce a current in the secondary wire, which current, flowing through the Geissler tube, illuminates it.

Should the battery J be out of order or any of the wires or connections of its circuit be broken, the circuit of the battery I will be closed by the relay-magnet P in the same manner as hereinbefore described, and an alarm given or signal displayed.

The Geissler tube, bulb, or coil, when used for outdoor railway signal or communicating purposes, should be placed in an elevated box open at one or both ends, and be long or deep, in order that its rear or central part should be dark, so that the illuminated tube will be distinctly seen in day-time as well as by night.

I do not confine myself to any particular device or devices for closing or controlling the electric circuit, and thereby causing a Geissler tube to be illuminated, as there are numerous devices employed for closing or controlling electric circuits, which can be operated or controlled by a railway-switch, locomotive, train, person, or anything employed or used along a railway.

I do not confine myself to employing a Geissler tube with any particular circuit or arrangement of wires, batteries, and devices, as there are numerous circuits and arrangements of wires, batteries, and devices employed for railway-signal purposes.

I do not confine myself to electricity generated by an induction-coil for illuminating the Geissler tube, as it can also be illuminated by electricity generated by other means.

I claim as my invention—

1. A Geissler tube, or its equivalent, illuminated by electricity, in combination with a track or railway switch circuit-closer, for general railway-signal purposes.

2. In combination with a track or railway-switch circuit-closer, a visual signal illuminated by an induced electrical current.

3. In combination with a railway-signal apparatus and a track or railway-switch circuit-closer, a visual signal illuminated by an induced electrical current.

In testimony whereof I hereunto sign my name in presence of two subscribing witnesses.

HENRY W. SPANG.

Witnesses:
A. L. BOYER,
C. T. SELLERS.